United States Patent Office 3,409,563
Patented Nov. 5, 1968

3,409,563
HYPERCONDUCTIVE GRAPHITE STRUCTURES
Franciszek Olstowski, Freeport, Tex., assignor to The Dow Chemical Company, Midland, Mich., a corporation of Delaware
No Drawing. Filed Apr. 4, 1966, Ser. No. 539,748
15 Claims. (Cl. 252—506)

ABSTRACT OF THE DISCLOSURE

This invention relates to a process for producing hyperconductive graphite structures and to the structures produced thereby. Hyperconductive graphite structures are produced by contacting vermicular expanded graphite with a fluid intercalation agent to produce graphite containing up to about 35 weight percent intercalation agent and compressing such treated graphite into a cohered structure having a density of at least about 0.07 gm./cc.

---

This invention relates to hyperconductive graphite structures and to a method for their preparation. It more particularly relates to compressed vermicular graphite structures having high conductivity and a process for producing such structures from vermicular graphite.

Previously, the conductivity of natural flake graphite has been temporarily increased by the introduction of an intercalating agent such as bromine between the laminae thereof. Such conductivity increase, however, was of short duration and transitory in that the graphite quickly returned to its original characteristics. Further, when the electrographite has been treated with intercalating agents, generally ruptures are created in the electrographite structures due to the brittleness of said structures. This is especially true when one attempts to obtain a sufficient concentration of lamellar compounds to attain high conductivity of such electrographite.

It is an object of this invention to provide practical and stable graphite structures possessing enhanced conductivity. Another object is to provide a process for preparing such structures. These and other objects and advantages of the present process will become apparent from a reading of the following detailed description.

It has now been discovered that hyperconductive graphite, capable of retaining its hyperconductive properties for long periods of time, is prepared by treating vermicular graphite with an intercalating agent and compressing the treated vermicular graphite into a relatively high density integral structure. Vermicular graphite as used herein, refers to a relatively low density, particulate, wormlike form of graphite produced from natural or synthetic graphite.

To produce the hyperconductive graphite structures of this invention according to the preferred embodiment, an amount of intercalation agent is added to vermicular graphite which equals between 0.5 weight percent and 35 weight percent of the total weight of the treated graphite, preferably between about 2 and 35 weight percent and most preferably between about 5 to 35 weight percent. The treated graphite is then compressed under a force of at least about 15 p.s.i., preferably from about 50 to about 50,000 p.s.i. or higher to produce an integral structure having a density of from about 0.07 gm./cc. to about 2.1 gm./cc. and preferably from about 0.25 gm./cc. to about 2.1 gm./cc. or higher. Such compression may be uniaxial, biaxial, radial, isostatic and the like to produce structures of any desired configuration. Structures produced in this manner are easily cut, machined or sanded to a further finished condition if desired. In general, the higher the content of intercalating agent in the compressed structure, the higher the conductivity of such structure.

Alternatively, where greater strength of the compressed graphite structure is desired, the vermicular graphite is blended with up to 35 weight percent of an organic binder. After compression to form the cohered graphite structure the binder is then fused or cured to provide the additional strength without unduly lowering the conductivity of the structure. Suitable organic binders include polyethylene, phenol-formaldehyde resins, epoxy resins, polyurethanes and the like.

Compression of vermicular graphite containing higher amounts of intercalating agents, e.g. 10 weight percent or more, usually yields a more resilient structure than one prepared from vermicular graphite containing less intercalating agent. If less resilience is desired at the same level of conductivity, an alternate but substantially equivalent procedure may be employed for producing such hyperconductive graphite structures. In such alternate procedure, the vermicular graphite is compressed to the desired density and shape, then treated with intercalating agent until the content of intercalating agent in the graphite structure reaches the desired level. Such procedure requires a longer treatment time to achieve the same level of concentration of the intercalating agent and a more dense, less resilient structure is produced.

Vermicular graphite is usually prepared by treating natural or synthetic graphite in particulate form with an expanding agent having strong oxidizing properties. Such agents include fuming nitric acid, fuming sulfuric acid, mixtures of concentrated nitric and sulfuric acid, perhaloacids such as $HClO_4$, and mixtures of oxidizing acids with strong oxidizing salts such as sodium perchlorate. Graphite treated with such agent may be expanded by heating to at least about 200° C. and preferably to at least about 500° C. to produce the vermicular form of graphite. Vermicular graphite produced in this manner usually has an apparent bulk density in the range of from about 0.005 gm./cc. to about 0.05 gm./cc. and is easily compressible into integral structures having a higher density. Uniaxial compression of such graphite produces a structure having a relatively high degree of electrical and thermal anisotropy. Biaxial compression substantially reduces such anisotropy and isostatic compression produces structures having little or no anisotropy.

Intercalating agents suitable for use herein are those materials which form lamellar compounds or interstitial compounds with graphite when contacted in the fluid state therewith. Such materials include $Br_2$, $FeCl_3$, $CrO_2Cl_2$, $SO_3$, $SbCl_5$, $CrCl_3$, $ICl$, $CrO_3$, $AuCl_3$, $InCl_3$, $PtCl_4$, $CrO_2F_2$, $TaCl_5$, $SmCl_3$, $ZrCl_4$, $UCl_4$, $YCl_3$ and the like.

The graphite, whether in vermicular or compressed vermicular form, is preferably treated with the intercalating agent by either contacting the graphite with a high concentration of such agent in gaseous form or by soaking such graphite in the intercalating agent in the liquid form. The normally solid intercalating agents must be heated in order to allow the vapors to penetrate the laminae of the graphite.

Structures prepared in accordance with this invention have specific resistances as low as one-sixth that of untreated vermicular graphite compacts or that of untreated natural graphite. In addition, the hyperconductive structures of this invention retain their hyperconductivity properties for extended periods of time and are therefore particularly useful as electric conductors, e.g. in corrosive atmospheres. Also, the lamellar-compound-containing graphite finds utility as a catalytic surface for halogenation reactions or as a reactive cathode in primary batteries.

The following examples are provided to more completely illustrate the invention but are not to be construed as limiting to its scope. In each of the following examples the term "density" means "apparent bulk density."

Example 1

A sample of vermicular graphite having a density of 0.005 gm./cc. was blended with 16.7 weight percent of anhydrous $FeCl_3$ powder, lightly compressed to a density of about 0.1 gm./cc. and heated to 250° C. The $FeCl_3$ vapors intercalated into the graphite compact and the compact swelled slightly along the axis of compression. After cooling, the compact was uniaxially compressed under a force of about 17,000 p.s.i. to yield a slab having a thickness of about 0.081 in. and a density of 2.1 gm./cc. Specific resistance of the compact measured perpendicular to the axis of compression was found to be 68 microhm-inches. After 6 days of exposure to ambient atmosphere and temperature, the specific resistance was found to be 70.8 microhm-inches. After 10 months of ambient exposure, the specific resistance of this slab of graphite was found to be 105 micro-inches and little or no increase in resistance occurred with time thereafter.

A sample of vermicular graphite containing no intercalating agent was compressed in the same manner and found to have a specific resistance of 165 microhm-inches.

In comparison, a ¼ in. diameter rod of commercial polycrystalline graphite was found to have a specific resistance of 379 microhm-inches in the axial direction. A portion of this graphite rod was placed in a sealed Pyrex tube containing anhydrous $FeCl_3$. The tube and contents were heated to 275–300° C. for about 6 minutes. After cooling, the excess $FeCl_3$ crystals on the surface of the graphite rod were removed. The rod contained about 4 weight percent $FeCl_3$ and was found to have a specific resistance of 300 microhm-inches. After exposure to ambient atmosphere and temperature for 6 days the specific resistance of the graphite rod was found to be 354 microhm-inches.

Example 2

A flexible garphite foil 0.073 in. in thickness was produced by uniaxially compressing vermicular graphite having a density of about 0.008 gm./cc. to a density of about 1.8 gm./cc. under a pressure of 10,000 p.s.i. The foil having a specific resistance of 167.0 microhm-inches was contacted with liquid bromine until it contained 12.3 weight percent bromine intercalcated therein. The specific resistance of such foil was found to be 30.4 microhm-inches in the direction perpendicular to the axis of compression. After 25 hours such foil had a specific resistance of 52.5 microhm-inches. After 3.5 days the foil was found to contain about 5 percent by weight of $Br_2$ and the specific resistance was measured to be about 75 microhm-inches. After another 24 hours the specific resistance was 78 microhm-inches. After about 30 days the specific resistance of the foil was 111 microhm-inches and no further increase was noted with time.

In comparison, a ⅛ inch diameter rod of commercial polycrystalline graphite having a specific resistance, in the axial direction, of 216 microhm-inches was slowly contacted with liquid bromine. Within about one minute the graphite rod developed a number of longitudinal cracks and ruptured into several pieces. The largest fragment was found to contain about 5 weight percent bromine and have a specific resistance of 90 microhm-inches. Twenty-seven hours later, the specific resistance was found to be 194 microhm-inches.

Example 3

A quantity of vermicular graphite having a density of about 0.005 gm./cc. was divided into 5 samples of equal size. Samples 2, 3, 4 and 5 were each treated with bromine to yield vermicular graphite containing 0.5 weight percent, 1.0 weight percent, 2.0 weight percent and 5.0 weight percent bromine, respectively. Sample 1 was not treated with bromine. Each sample was then uniaxially compressed under a pressure of 10,000 p.s.i. to yield a cohered flexible slab about 1¼ inches wide, 4⅝ inches long and having a thickness of about ⅛ inch. The specific resistance of each sample was measured and the results are shown in the following tabulation.

| Sample No. | Wt.-percent $Br_2$ | Specific Resistance, Microhm-inches |
|---|---|---|
| 1 (Control) | 0 | 161 |
| 2 | 0.5 | 156 |
| 3 | 1.0 | 144 |
| 4 | 2.0 | 124 |
| 5 | 5.0 | 74 |

Example 4

A 15 gram sample of vermicular graphite having a density of about 0.005 gm./cc. was contacted treated with gaseous $SO_3$ to a content of about 10 weight percent. The treated vermicular graphite was then uniaxially compressed in a mold under a pressure of 10,000 p.s.i. and the pressure was maintained for 45 minutes. Upon releasing the pressure, the compact swelled from a thickness of about 0.1 inch to about 0.5 inch and was found to be resilient in the axis of compression. Such compact had a density of about 0.36 gm./cc. and a specific resistance in the plane perpendicular to the compression vector of 300 microhm-inches.

An additional sample of the same vermicular graphite which had not been treated with $SO_3$ was compressed to the same density and found to have a specific resistance in the plane perpendicular to the compression vector of 1330 microhm-inches.

Example 5

A sample of vermicular graphite having a density of about 0.005 gm./cc. was contacted with $CrO_2Cl_2$ vapors to yield a mass containing 0.7 weight percent $CrO_2Cl_2$. Compression under a force of 17,000 p.s.i. yielded a compact having a specific resistance of 104 microhm-inches.

The same vermicular graphite without the $CrO_2Cl_2$ treatment compressed in the same manner had a specific resistance of 161 microhm-inches.

Example 6

A sample of vermicular graphite compressed into a slab having a density of about 0.5 gm./cc., was treated with liquid $SbCl_5$ and the mixture was heated to 200° C. to remove any excess $SbCl_5$. The treated mass, containing about 5 weight percent $SbCl_5$ was compressed under a force of 10,000 p.s.i. to produce an integral graphite structure having a specific resistance of 114 microhm-inches.

The same vermicular graphite (untreated) compressed in the same manner had a specific resistance of about 165 microhm-inches.

Example 7

Eighteen grams of vermicular graphite having a density of about 0.005 gm./cc. was heated at about 270° C. while being contacted with hot $FeCl_3$ vapors at about the same temperature. After a few minutes the graphite was cooled to room temperature and found to weigh 25 grams. The mixture, therefore, contained 28 percent by weight of $FeCl_3$.

The treated vermicular graphite was then compressed uniaxially to yield a cohered compact having an apparent bulk density of about 0.15 gm./cc. and the compact was "heat-soaked" at about 225° C. for about 10 minutes in a closed vessel. After cooling to room temperature, the compact was further compressed along the same axis as before to a density of about 2.1 gm./cc. The compact thus prepared was found to have a specific resistance of 29.8 microhm-inches in the plane perpendicular to the compression vector.

Example 8

Vermicular graphite having a density of about 0.005 gm./cc. was blended wtih a polyethylene powder at a graphite/P.E. ratio of 3/1 by weight. The blend was compressed along one axis to a density of about 0.2 gm./cc. and then along the axis perpendicular to that of the first compression to a final density of about 1.5 gm./cc. The polyethylene was then fused by heating the compact to about 150° C. for about 20 minutes.

A slice of the compact was taken which measured 3 inches by 0.25 inch by 0.105 inch thick and wherein the 3 inch dimension was in the direction perpendicular to each of the compression vectors. The slice weighed 2.97 grams, was found to have 285 microhm-inches specific resistance along the 3 inch dimension. The slice was immersed in liquid $Br_2$ at about 23° C. for about 5 hours causing the slab to swell in thickness from 0.105 inch to 0.121 inch. The swelling caused no fracturing of the compact and the specific resistance of the swelled compact was found to be 152 microhm-inches.

Various modifications can be made in the present invention without departing from the spirit or scope thereof for it is understood that I limit myself only as defined in the appended claims.

I claim:

1. A hyperconductive graphite structure comprising compressed vermicular graphite having a density of at least about 0.07 gm./cc. and containing in combination therewith from about 0.5 weight percent to about 35 weight percent of an intercalation agent selected from the group consisting of $Br_2$, $FeCl_3$, $CrO_2Cl_2$, $SO_3$, $SbCl_5$, $CrCl_3$, $ICl$, $CrO_3$, $AuCl_3$, $InCl_3$, $PtCl_4$, $CrO_2F_2$, $TaCl_5$, $SmCl_3$, $ZrCl_4$, $UCl_4$ and $YCl_3$.

2. The structure of claim 1 wherein the intercalation agent is $Br_2$.

3. The structure of claim 1 wherein the intercalation agent is $FeCl_3$.

4. The structure of claim 1 wherein the intercalation agent is $CrO_2Cl_2$.

5. The structure of claim 1 wherein the intercalation agent is $SO_3$.

6. The structure of claim 1 wherein the intercalation agent is $SbCl_5$.

7. The structure of claim 1 containing from 1–35 weight percent of an organic binder.

8. A process for the preparation of hyperconductive graphite structures from vermicular graphite which comprises
    (a) contacting vermicular graphite with an intercalating agent selected from the group consisting of $Br_2$, $FeCl_3$, $CrO_2Cl_2$, $SO_3$, $SbCl_5$, $CrCl_3$, $ICl$, $CrO_3$, $AuCl_3$, $InCl_3$, $PtCl_4$, $CrO_2F_2$, $TaCl_5$, $SmCl_3$, $ZrCl_4$, $UCl_4$, and $YCl_3$ at a temperature at which the intercalating agent is at least partially fluid, and
    (b) compressing such treated graphite to a density of at least about 0.07 gm./cc.

9. The process of claim 8 wherein the content of intercalating agent in the graphite is between about 0.5 weight percent and about 35 weight percent.

10. The process of claim 9 wherein the intercalating agent is $Br_2$.

11. The process of claim 9 wherein the intercalating agent is $FeCl_3$.

12. The process of claim 9 wherein the intercalating agent is $CrO_2Cl_2$.

13. The process of claim 9 wherein the intercalating agent is $SO_3$.

14. The process of claim 9 wherein the intercalating agent is $SbCl_5$.

15. A process for preparing a hyperconductive graphite structure from vermicular graphite which comprises
    (a) compressing vermicular graphite to a density of between about 0.07 gm./cc. to about 2.0 gm./cc., and
    (b) contacting such compressed graphite structure with sufficient fluid intercalating agent selected from the group consisting of $Br_2$, $FeCl_3$, $CrO_2Cl_2$, $SO_3$, $SbCl_5$, $CrCl_3$, $ICl$, $CrO_3$, $AuCl_3$, $InCl_3$, $PtCl_4$, $CrO_2F_2$, $TaCl_5$, $SmCl_3$, $ZrCl_4$, $UCl_4$, and $YCl_3$ to produce a content of between about 0.5 weight percent and about 35 weight percent of such intercalating agent in such graphite structure.

References Cited

UNITED STATES PATENTS 3,323,869  6/1967  Olstowski _____ 23—209.1

LEON D. ROSDOL, *Primary Examiner.*

J. D. WELSH, *Assistant Examiner.*